United States Patent Office 3,062,010
Patented Nov. 6, 1962

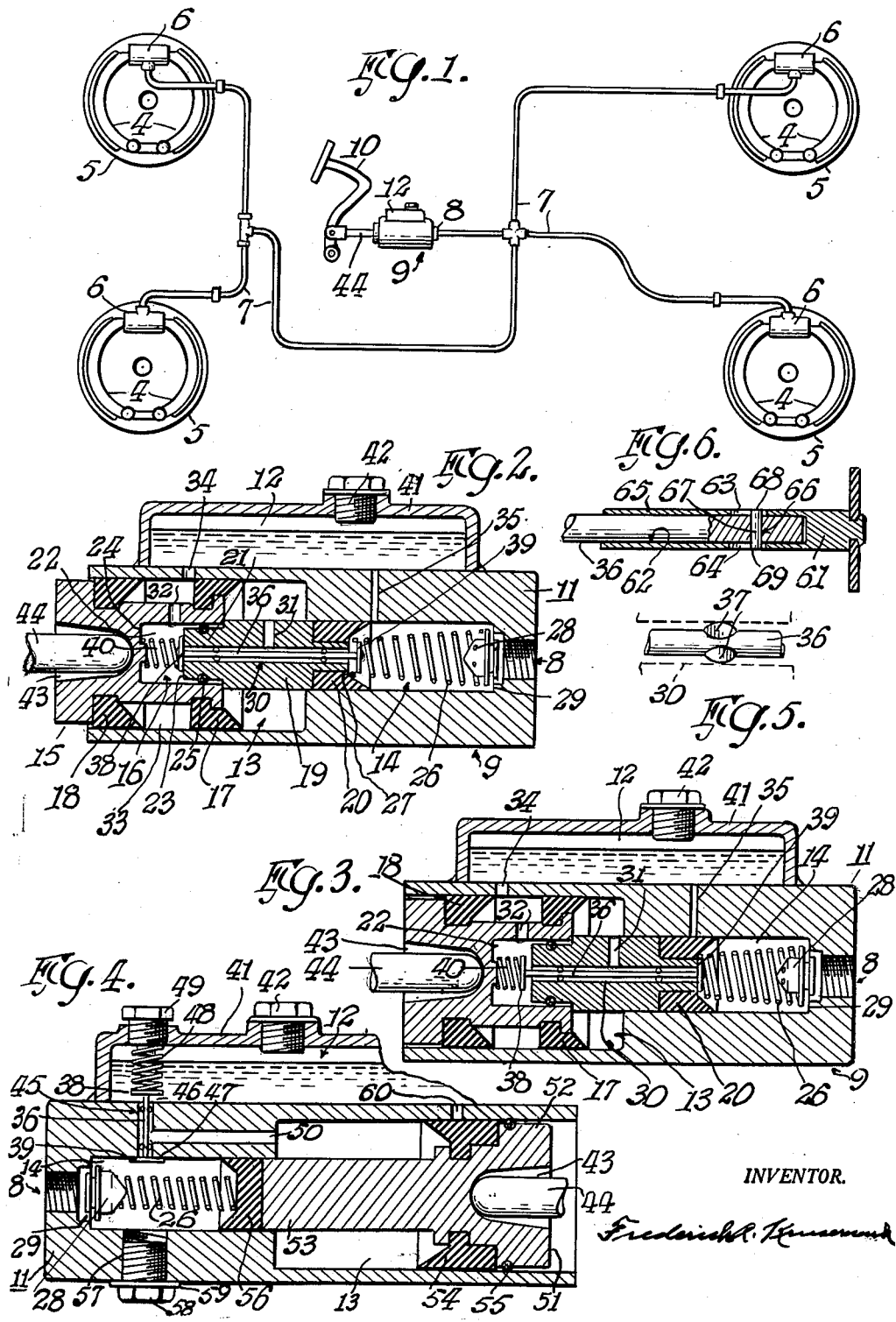

3,062,010
TWO-STAGE HYDRAULIC MASTER CYLINDER
Frederick A. Krusemark, 303 S. 2nd Ave., Maywood, Ill.
Filed Aug. 23, 1960, Ser. No. 51,345
7 Claims. (Cl. 60—54.6)

This invention relates to a two-stage hydraulic master cylinder for a hydraulic brake system and more particularly to a master cylinder comprising two coaxially arranged bores, one of which is of larger diameter than the other and a pair of pistons operable in the coaxial bores, the larger of which being initially for use in supplying fluid for bringing the brake shoes in a braking system against the brake drums and the smaller of which is for supplying hydraulic pressure to the shoes for stopping engagement with the brake drums whereby pedal pressure required to effect a given brake application is reduced.

In a conventional hydraulic brake system, a relatively large amount of pedal pressure is required to apply the brakes. The mechanical advantage between the brake shoes and the pedal cannot be increased in a conventional system without producing objectionable and excessive pedal travel.

The use of external power has been resorted to in order to obtain the desired braking force with a relatively low pedal pressure and with low pedal travel. However, the installation of this type of brake is expensive, and, when the source of this external power is provided by means of a vacuum, the source of external power is cut off in the event the automobile engine stalls thereby setting up a hazard in the operation of a car so equipped. Also, a driver has a better sense of feel with respect to operating a car equipped with my braking system as compared with cars equipped with a braking system which includes means for using external power, and therefore safer to operate, particularly when road conditions are hazardous. It has also been proposed to utilize a hydraulic booster mechanism which provides a relatively low mechanical advantage until the brake shoes engage the drum and that automatically shifts to a higher mechanical advantage for the actual braking effect. My new invention relates to an improved two-stage hydraulic master cylinder, and has for its principal object the provision of such a master cylinder which is simple and inexpensive to manufacture, which is positive and extremely reliable in use and which is virtually of the same size and general design of conventional master cylinders.

An important object of my invention is to provide a two-stage hydraulic master cylinder in which the change of mechanical advantage is effected solely in response to fluid pressure developing in the system so that it is independent of brake wear and adjustment.

A further object of my invention is to provide a two-stage hydraulic master cylinder in which no spring is used which is biased against the movement of the piston other than the one normally used in a conventional master cylinder, so that virtually all the force exerted on the pedal is effective to apply the brakes.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIG. 1 is a diagrammatic view of a hydraulic brake system to which my two-stage hydraulic master cylinder is applied;

FIG. 2 is a sectional view through one form of my two-stage hydraulic master cylinder showing the parts in brake released position;

FIG. 3 is a similar view to FIG. 2 showing the parts in brake applied position;

FIG. 4 is a sectional view through a modified form of my two-stage hydraulic master cylinder showing the parts in brake applied position;

FIG. 5 is an enlarged fragmentary view of the valve stem, shown in FIGS. 2, 3 and 4, showing a swedged portion thereof; and FIG. 6 is an enlarged modified fragmentary view of the valve stem showing a valve head slideably attached thereto.

Like characters of reference designate like parts in the several drawings.

My two-stage hydraulic master cylinder can be used in any hydraulic braking system as illustrated generally in FIG. 1. Such a system may include a plurality of brake shoes 4 at the vehicle wheel, adapted to be moved into engagement with brake drums 5 by means of actuator cylinders 6. Normally, brake shoes are slightly spaced from the drums 5 by return springs, not shown, and are adapted to be forced into frictional engagement with the drums 5 when fluid under pressure is supplied to the actuator cylinders 6. The actuator cylinders 6 are connected through conduits 7 to an outlet 8 of my two-stage hydraulic master cylinder 9 which is operated by a brake pedal 10 hereinafter more fully described.

A preferred embodiment of my two-stage hydraulic master cylinder, shown in FIGS. 2 and 3 in brake release position and brake applied position, respectively, comprises a casing 11, having a fluid reservoir 12 therein, and a large bore 13 and a smaller bore 14, coaxially arranged. A large piston 15 having a cylindrical bore 16 therein at one end and operable in the large bore 13, is sealed thereagainst by a pair of cups 17 and 18. A smaller piston 19 is operable in the smaller bore 14 and sealed thereagainst by a cup 20 which has a reduced diameter 21 at one end in telescopic engagement with the cylindrical bore 16 thereby providing a cavity 22 between a face 23 of the reduced diameter 21 of the smaller piston 19 and an end wall 24 of the cylindrical bore 16. An O ring 25 provides a sealing means between the surfaces of the cylindrical bore 16 and the reduced diameter 21 of the smaller piston 19. A return spring 26 is provided in the smaller bore 14 and is biased between a face 27 of the smaller piston 19 and a conventional check valve 28 which overlies the outlet 8 and rests against an end wall 29 of the smaller bore 14.

A passage 30 extends longitudinally through the smaller piston 19 which communicates with the smaller bore 14 and the cavity 22 in the large piston 15. The smaller piston 19 is provided with a communicating port 31 which extends transversely therethrough and is in fluid flow communication with the passage 30 and the large bore 13. The large piston 15 is provided with a communicating port 32 which extends transversely therein and is in fluid flow communication with the cavity 22 and an annular chamber 33 lying between the cups 17 and 18. The casing 11 is provided with a pair of compensating ports 34 and 35 which are in fluid flow communication between the fluid reservoir 12 and the annular chamber 33, and the fluid reservoir 12 and the smaller bore 14, respectively. The pair of compensating ports 34 and 35 serve to provide fluid from the fluid reservoir 12 for replacing any fluid loss in the braking system. A valve stem 36, having swedged portions 37 serving as guides, extends through the passage 30 and carries a pair of valve heads 38 and 39 one at each end thereof for operable sealing engagement with the face 23 at one end of the smaller piston 19 and the face 27 at the other end of the smaller piston 19, respectively. A spring 40 is biased between the wall 24 of the cylindrical bore 16 and the valve head 38 for urging the valve head 38 into sealing engagement with the face 23 which thereby seals off fluid flow communication between the passage 30 and the cavity 22 and also provides disengagement between the valve head 39 and the face 27 which thereby provides fluid flow communication between the smaller bore 14, the passage 30, the communicating port 31 and the large bore 13. A top wall 41 of the fluid reservoir 12 is provided with a conventional filler plug 42.

The large piston 15 has a conical recess 43 for receiving a push rod 44 connected to the brake pedal 10.

FIG. 4 shows a modified form of my invention and operates similarly to my preferred embodiment. It is primarily characterized by a relocation of the valve stem 36 and the pair of valve heads 38 and 39 attached thereto. The valve stem 36 is positioned in a vertical passage 45 between the fluid reservoir 12 and the smaller bore 14. A pair of faces 46 and 47 in the reservoir 12 and the smaller bore 14, respectively, provide operable sealing engagement between the valve head 38 and the face 46 and between the valve head 39 and the face 47. A spring 48 is biased between the valve head 38 and an access plug 49 for urging the valve head 38 into sealing engagement with the face 46 which is the position of the valve head 38 in brake release position. It is apparent that this drawing shows my modified form in brake applied position under which condition the valve head 39 is in sealing engagement with the face 47 which shuts off communication between the vertical passage 45 and the smaller bore 14, and the valve head 38 is disengaged from the face 46 which thereby establishes fluid communication between the fluid reservoir 12 and the large bore 13 by means of the vertical passage 45 and a horizontal passage 50 communicating with the vertical passage 45 and the large bore 13.

A compound piston 51 is provided with an enlarged portion 52 and a smaller portion 53. The enlarged portion 52 is operable in the large bore 13 and sealed thereagainst by a cup 54 and an O ring 55. The smaller portion 53 is operable in the smaller bore 14 and is sealed thereagainst by a cup 56. The spring 26 is biased between the cup 56 and the check valve which overlies the outlet 8 and rests against an end wall 29 of the smaller bore 14. The casing 11 is provided with a transverse opening 57 which serves as a means for access with respect to the assembling of the valve stem 36 and the valve head 39. A cap screw and a washer, 58 and 59, respectively, are provided to close the transverse opening 57. The casing 11 is provided with a compensating port 60 in fluid communication between the fluid reservoir 12 and the large bore 13 which serves to provide fluid from the fluid reservoir 12 for replacing any fluid loss in the braking system.

FIG. 6 shows a means for slideably attaching the valve head 39 with the valve stem 36. The valve head 39 is attached to a part 61 having a bore 62 therein and a pair of aligned slots 63 and 64 through a wall 65 of the cylindrical bore 62. The valve stem 36 is provided with a hole 66 for receiving a pin 67 which is slideably confined at ends 68 and 69 thereof, within the slots 63 and 64, respectively.

This modification of slideably attaching the valve head 39 to the valve stem 36 permits the valve head 39 to move into close proximity with the face 27 when, during operation, the pressure build-up in the smaller bore 14 has reached a point to overcome the resistance of the spring 40. The distance of free travel of the valve head 39, however, is such that when the valve head 39 sealingly engages the face 27, the valve head 38 is disengaged from the face 23 thereby permitting the fluid from the large bore 13 to return to the fluid reservoir 12, as heretofore shown. This modification of assembling the valve head 39 with respect to the valve stem 36 is effective to reduce to a minimum the amount of fluid loss from the smaller bore 14 when the build-up of pressure during operation is of such a value so as to bring the valve head 39 into sealing engagement with the face 27.

In operation, when pressure is applied, initially, to the brake pedal 10 and communicated through the push rod 44 against the large piston 15 through its contact therewith in the conical recess 43, the large piston 15 and the smaller piston 19 are moved within the large bore 13 and the smaller bore 14, respectively. This movement of the pistons forces fluid from the large bore 13 through the communicating port 31 into the passage 30 and thence into the smaller bore 14 where it commingles with the fluid therein and then passes through the outlet 8 into the actuator cylinders 6 whereby the brake shoes 4 are moved into contact with the brake drums 5. It is, of course, understood that some fluid may pass into the fluid reservoir 12 through the compensating port 35, which, as heretofore mentioned, serves to supply fluid that has been lost in the operation of the braking system. When the brake shoes 4 are thus moved into contact with the drums 5, no additional fluid can pass into the actuator cylinders 6 because the brake shoes 4 have been stopped from further movement by contacting the brake drums 5; consequently, since no more fluid can be moved out of the master cylinder 9, there can be substantially no further travel of the brake pedal 10. Additional pressure on the brake pedal 10 builds up additional pressure in the system which is exerted against the valve head 39, and, in turn, against the spring 40. It is obvious that pressure is also exerted against the other side of the valve head 39; however, since part of this area is taken up by the valve stem 36, the pressure exerted against the head of the valve is therefore greater, and, in addition, the exposed area at the inner face of the valve head 38 is also subject to the fluid pressures in the system and therefore also exerted against the spring 40. Consequently, when the pressure build-up exceeds a predetermined value of the spring 40, it is compressed, thereby unseating the valve head 38 which thereby establishes communication between the fluid reservoir 12 and the large bore 13 by way of communicating port 31, passage 30, cavity 22, communicating port 32, annular chamber 33 and compensating port 34 as shown in the brake applied position drawing in FIG. 3, and substantially, simultaneously therewith the valve head 39 closes the passage 30 against communication with the smaller bore 14. Additional pressure against the brake pedal 10 is transmitted to the brake shoes 4 from the pressure build-up in the smaller bore 14 which is exerted against the fluid therein by the smaller piston 19. For all practical purposes, the smaller piston 19 will not travel further as a result of the pressure exerted against the brake pedal 10 because there is no place for the fluid to go and the fluid itself is not compressible. The pressure against the fluid thereby is exerted only by means of the smaller piston 19 because the fluid in the large bore 13 is now bypassed into the fluid reservoir 12, as heretofore shown.

Therefore, since pressure against the fluid in the braking system now is exerted only by means of the smaller piston 19, less braking effort is required for a given condition in braking an automobile than would be required if the braking effort were transmitted by means of both the large piston 15 and the smaller piston 19 and this is accomplished without additional brake pedal travel after the function of providing pressure in the system has been transferred to the smaller piston 19.

It is therefore apparent that my two-stage hydraulic master cylinder reduces braking effort for a given condition in proportion to the difference in areas between the face of the smaller piston 19 and the combined faces of the smaller piston 19 and the large piston 15, and, this is accomplished without appreciably increasing pedal travel beyond that of a conventional master cylinder.

On releasing pressure that has been applied to the brake pedal 10, the actuator cylinders 6, which are of conventional type, return the amount of fluid supplied during the braking operation to my two-stage hydraulic master cylinder. More specifically, when the fluid returns after pressure release, the large piston 15 and the smaller piston 19 return to their starting position, as shown in FIG. 2. This is due to the return pressure applied by the actuator cylinders 6 and the return spring 26. It should be noted that on release of pressure against the brake pedal 10, there is nothing to pervent the large piston 15 from returning to its starting position, such as a vacuum lock in the large bore 13. This is so because the fluid in the large bore 13 is in communication with the fluid reservoir 12 when the valve head 38 is unseated as heretofore shown. On the other hand, if the valve head 38 should close the passage 30 and thus shut off fluid communication between the large bore 13 and the fluid reservoir 12, the valve head 39 is disengaged from the face 27 of the smaller piston 19 thereby establishing communication between the large bore 13 and the smaller bore 14, as is apparent from the drawings and therefore in neither event could a vacuum lock occur.

The operation of a modified form of my invention shown in FIG. 4 is basically the same as that of my preferred embodiment. When pressure is applied initially to the brake pedal 10 and communicated through the push rod 44 against the compound piston 51 through its contact therewith in the conical recess 43, the enlarged portion 52 and the smaller portion 53 are moved within the large bore 13 and the smaller bore 14, respectively. This movement of the compound piston 51 forces fluid from the large bore 13 through the horizontal passage 50 and into the smaller bore 14 by way of the vertical passage 45 which is open in the initial stage of operation by virtue of the bias of spring 48. The fluid from the large bore 13 thus commingles with the fluid in the smaller bore 14 and passes through the outlet 8 into the actuator cylinders 6 whereby the brake shoes 4 are moved into contact with the brake drums 5. It should be noted that as in the case with respect to the operation of my preferred embodiment, some of the fluid initially may pass through the compensating port 60. This is also true with respect to a conventional master cylinder.

When the brake shoes 4 are thus moved into contact with the brake drums 5, no additional fluid can pass into the actuator cylinders 6 because the brake shoes 4 have been stopped from further movement by contacting the brake drums 5; consequently, since no more fluid can be moved out of the master cylinder 9, there can be no further travel of the brake pedal 10, except, of course, that which is inherently due to the flexibility of the mechanical means involved. Additional pressure on the brake pedal 10 builds up additional pressure in the system which is exerted against the valve head 39 and in turn against the spring 48, whereby the valve head 39 is seated against the face 47 and the valve head 38 is disengaged from the face 46, in the same manner as shown with respect to my preferred embodiment. Communication is thus established between the fluid reservoir 12 and the large bore 13 by way of the horizontal passage 50 and the vertical passage 45 which permits fluid from the large bore 13 to return to the fluid reservoir 12. Since the valve head 39 has closed the vertical passage 45 against communication with the smaller bore 14, additional pressure against the brake pedal 10, is transmitted to the brake shoes 4 by the pressure build-up in the smaller bore 14 by means of the smaller portion 53. The enlarged portion 52 now is inoperative to provide fluid to the systems, as shown above, because fluid in the large bore 13 is in communication with the fluid reservoir 12, and therefore no resistance by the large portion 52 is offered, in the build-up of pressure in the system through the smaller portion 53.

From this it is apparent that the operation of a modified form of my invention, the performance, is the same as that in my preferred embodiment.

One release of pressure applied to the brake pedal 10, the amount of fluid supplied by the actuator cylinders 6 is returned to the master cylinder 9.

More specifically, when the fluid returns after pressure release, the compound piston 51 returns to its brake release position under the influence of the return pressure of the actuator cylinders 6 and the return spring 26. Residual pressure in the system, if any, will, of course, be exerted against the valve head 39. However, the pressure of the spring 48 against valve head 39 is of a value such that it will overcome the residual pressure against the valve head 38, thereby opening the vertical passage 45 which permits the return of all the fluid which has been supplied to the actuator cylinders 6 and thus the components of my two-stage hydraulic master cylinder 9 are returned to their brake release position.

I wish it to be understood that my invention is not to be limited to the specific constructions and arrangements shown and described except only insofar as the appended claims may be so limited, as it will be apparent to those skilled in the art that changes may be made without departing from the principles of the invention.

I claim:

1. A two-stage master cylinder for hydraulic brake systems comprising a casing having therein a fluid reservoir, a large bore, a smaller bore, a large piston having a pair of cups operable in said large bore said pair of cups providing an annular chamber therebetween, a smaller piston operable in said smaller bore, fluid passage means including a longitudinal passage in said smaller piston affording communication between said large bore and said smaller bore, a cavity in said large piston in fluid communication with said annular chamber and said longitudinal passage fluid passage means affording communication between said reservoir and said smaller bore, a part operable in said longitudinal passage having a pair of valve heads one on each end thereof one of said valve heads being effective to open and close fluid communication between said smaller bore and said longitudinal passage and said other valve head being effective to open and close fluid communication between said fluid reservoir and said longitudinal passage, spring means in said cavity for urging said valve heads in a direction to open fluid communication between said large bore and said smaller bore, an outlet in said smaller bore in fluid communication with actuator cylinders in the braking system, a check valve operably associated with said outlet, a return spring biased between said small piston and said check valve, manually operable pressure affording means for moving said pistons in said bores from their brake release position therein to thereby provide hydraulic pressure in said actuator cylinders.

2. A two-stage master cylinder for hydraulic brake systems comprising a casing having therein a fluid reservoir, a large bore, a smaller bore, a large piston provided with a pair of cups spaced apart operable in said large bore said pair of cups providing an annular chamber therebetween, a cavity in said large piston in fluid communication with said annular chamber, a smaller piston operable in said smaller bore, fluid passage means affording communication between said fluid reservoir and said large bore, fluid passage means including a longitudinal passage in said smaller piston affording communication between said large bore and said smaller bore, fluid passage means affording communication between said reservoir and said smaller bore, a valve stem operable in said longitudinal passage having a pair of valve heads connected at the ends thereof one of said valve heads being effective to open and close communication between said smaller bore and said large bore and said other valve head being effective to open and close fluid communication between said cavity and said longitudinal passage, spring means in said cavity for urging said other valve head to close communication between said cavity and said longitudinal passage, whereby said one of said valve heads is urged to open communication between said smaller bore and said large bore, an outlet in said small bore in fluid communication with actuator cylinders in the braking system, a check valve operably associated with said outlet, flexible means in said small bore urging said check valve to a closed position, manually operable pressure affording means for moving said pistons in said bores from their brake release position therein to thereby provide hydraulic pressure in the braking system, and means operable when said pressure is released for returning said pistons to said brake release position.

3. A two-stage master cylinder for hydraulic brake systems, according to claim 2, wherein one of said valve heads is slideably attached to said valve stem.

4. A two-stage master cylinder for hydraulic brake systems comprising a casing having therein a fluid reservoir, a large bore, a smaller bore, a large piston having a pair of cups operable in said large bore, a smaller piston having a cup operable in said smaller bore, an annular chamber between said pair of cups, a cavity in said large piston, a longitudinal passage through said smaller piston in fluid communication with said cavity and said smaller bore, a first port affording communication between said fluid reservoir and said annular chamber, a second port affording communication between said annular chamber and said cavity, a third port affording communication between said large bore and said longitudinal passage, a fourth port affording communication between said fluid reservoir and said smaller bore, a part operably associated with said longitudinal passage having a pair of interconnected valve means one of said valve means being effective to open and close fluid communication between said smaller bore and said large bore, said other valve means being effective to open and close fluid communication between said cavity and said large bore, spring means for urging said other valve means to close communication between said cavity and said large bore, whereby said one of said valve means is urged to open communication between said smaller bore and said large bore, an outlet in said small bore in fluid communication with actuator cylinders in the braking system, a check valve operably associated with said outlet, flexible means in said small bore urging said check valve to a closed position manually operable pressure affording means for moving said pistons in said bores from their brake release position therein to thereby provide hydraulic pressure in the brake system, and means operable when said pressure is released for returning said pistons to said brake release position.

5. A two-stage master cylinder for hydraulic brake systems, according to claim 6, wherein said means operable when said pressure is released for returning said pistons to said brake release position comprises a spring in said smaller bore seated against the end of said smaller piston to thereby bias said smaller piston toward said brake release position.

6. A two-stage master cylinder for hydraulic brake systems comprising a casing having therein a fluid reservoir, a large bore, a smaller bore, a large piston having a pair of cups operable in said large bore, a smaller piston having a cup operable in said smaller bore, an annular chamber between said pair of cups, a cavity in said large piston, a longitudinal passage through said smaller piston in fluid communication with said cavity and said smaller bore, a first port affording communication between said fluid reservoir and said annular chamber, a second port affording communication between said annular chamber and said cavity, a third port affording communication between said large bore and said longitudinal passage, a fourth port affording communication between said fluid reservoir and said smaller bore, a valve stem operable in said longitudinal passage, a pair of valve heads attached one each to each end of said valve stem, one of said valve heads being effective to open and close the end of said longitudinal passage that is in communication with said smaller bore, the said other valve head being effective to open and close the end of said longitudinal passage that is in communication with said cavity, spring means urging said other valve head to close the end of the said longitudinal passage that is in communication with said cavity, an outlet in said small bore in fluid communication with actuator cylinders in the braking system, a check valve operably associated with said outlet, flexible means in said small bore urging said check valve to a closed position manually operable pressure affording means for moving said pistons in said bores from their brake release position therein to thereby provide hydraulic pressure in the brake system, and means operable when said pressure is released for returning said pistons to said brake release position.

7. A two-stage master cylinder for hydraulic brake systems, according to claim 6, wherein the said smaller piston is removeably attached to said large piston and sealed thereagainst.

References Cited in the file of this patent

UNITED STATES PATENTS

| 2,031,360 | Boughton | Feb. 18, 1936 |
| 2,190,238 | Lepersonne | Feb. 13, 1940 |
| 2,206,629 | Bowen | July 2, 1940 |
| 2,214,966 | Loweke | Sept. 17, 1940 |

FOREIGN PATENTS

| 515,709 | Great Britain | Dec. 12, 1939 |